UNITED STATES PATENT OFFICE.

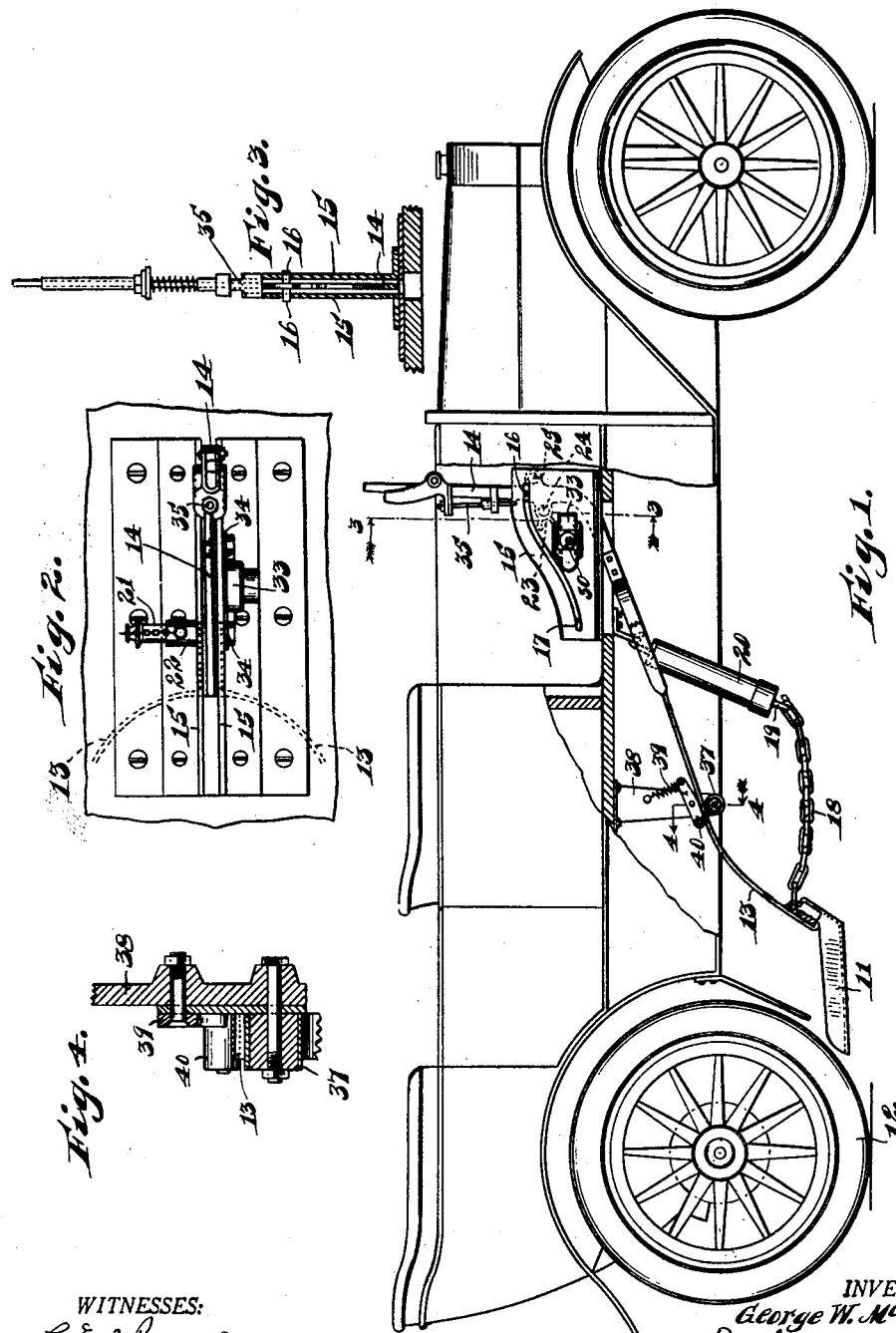

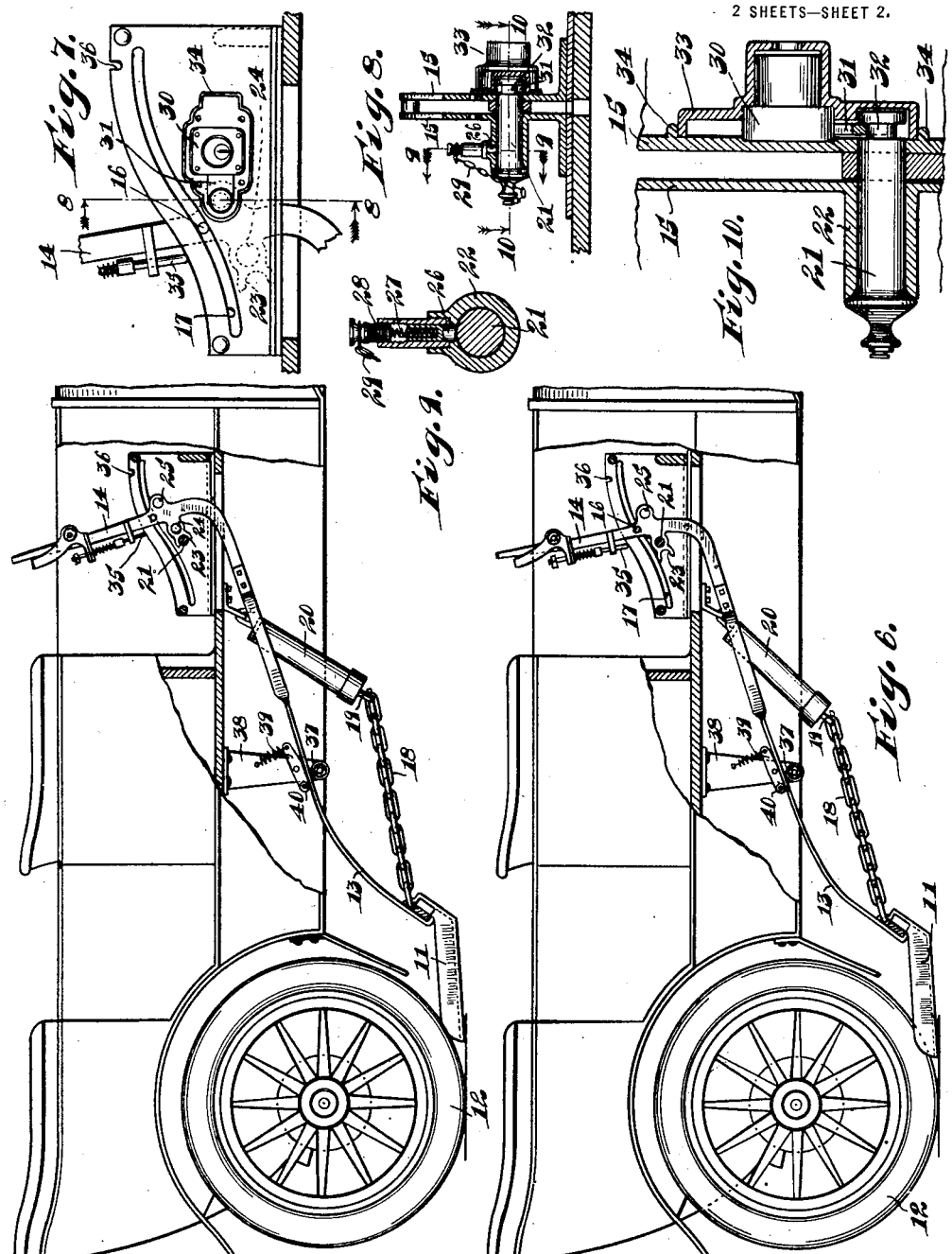

GEORGE W. McKINNY, OF CHICAGO, ILLINOIS.

VEHICLE LOCK AND BRAKE.

1,371,317.  Specification of Letters Patent.  Patented Mar. 15, 1921.

Application filed December 18, 1918. Serial No. 267,291.

*To all whom it may concern:*

Be it known that I, GEORGE W. McKINNY, a citizen of the United States, and a resident of the city of Chicago, county of Cook, and State of Illinois, have invented certain new and useful Improvements in Vehicle Locks and Brakes, of which the following is a specification.

My invention relates to improvements in vehicle locks and brakes, and has for its object the production of a device of this character which will be positive in operation and highly efficient.

Other objects will appear hereinafter.

The invention consists in the combinations and arrangements of parts hereinafter described and claimed.

The invention will be best understood by reference to the accompanying drawings forming a part of this specification, and in which, Figure 1, is a partially sectional side elevation of a vehicle equipped with mechanism embodying the invention, Fig. 2 is a fragmentary top plan view of a brake lever included in the construction, Fig. 3 is an enlarged section taken on line 3—3 of Fig. 1, Fig. 4 is an enlarged section taken on line 4—4 of Fig. 1, Figs. 5 and 6 are views similar to Figs. 1 and 2, showing the brake shoes in different positions to which the same may be adjusted, Fig. 7, is a fragmentary view illustrating still another position in which the brake lever may be locked, Fig. 8, is a section taken on line 8—8 of Fig. 7, Fig. 9, is an enlarged section taken on line 9—9 of Fig. 8, and Fig. 10, is an enlarged section taken on line 10—10 of Fig. 8.

The preferred form of construction, as illustrated in the drawings, comprises a pair of friction shoes 11 of channel form, which are arranged directly forward of the rear wheels 12 of the vehicle. The friction shoes 11 are carried at the rearward ends of arms 13, which are connected at their forward ends with a lever 14 which is shiftably or movably mounted between guide plates 15 arising from the floor of the vehicle, substantially central thereof. The lever 14 is provided with laterally projecting studs 16 which slidably engage in guide slots 17 formed in the members 15. The arrangement is such as will be seen, that friction shoes 11 may be moved longitudinally of the vehicle so as to insert the same under or remove the same from under the wheels 12 through manipulation of lever 14. For reinforcement and cushioning, chains 18 are connected with the front ends of friction shoes 11, the front ends of said chains being connected with spring-held bolts 19 shiftably mounted in spring housings 20 which are secured to the under side of the floor of the vehicle, as clearly seen in the several views.

Coöperating with the lever 14 for locking the same in various positions of adjustment is a bolt 21, shiftably mounted in a tubular housing 22 formed upon one of the guide members 15. The bolt 21 extends transversely of the guide members 15, being adapted to engage with a recess 23 or slots 24 and 25 formed in the lever 14, as clearly seen in Figs. 5, 6 and 7. The recess 23 is so positioned that when the same is engaged with the bolt 21, the friction shoes 11 will be positioned just ahead of the under sides of the rear wheels but contacting with the pavement, said friction shoes, in this position, being adapted to prevent skidding of the vehicle, as will be readily understood. The slot 24 is so positioned that when the bolt 21 is in engagement therewith, the friction shoes will be positioned in practically the same position as just described, but in this position the friction shoes will be positively locked against either forward or rearward movement, the same being thus adapted, when thus arranged and locked, to prevent backing up of the vehicle in hill-climbing, it being clear that said shoes, in this position thereof, would, in the event of backing up of the vehicle, pierce the ground and thus serve as a brake against backward movement. The slot 25 is so positioned that when the bolt 21 is engaged therewith, the friction shoes will be positioned completely under the vehicle wheels, thus making it impossible to operate the vehicle, the friction shoes, when thus locked, constituting an effective lock against theft or unauthorized operation of the vehicle.

Coöperating with the bolt 21 is a plunger 26 which is normally pressed toward said bolt by means of a helical compression spring 27, as clearly seen in Fig. 9. Coöperating with said spring is an adjustable screw plug 28, whereby the tension of the spring may be readily adjusted. Said plunger serves to frictionally hold the bolt 21 in inoperative position, the arrangement being such that said bolt will be securely held against accidental movement, notwithstanding severe throbbing or jolting to which the vehicle may be subjected. The screw plug 28 is held against detachment by a chain 29.

Coöperating with the bolt 21 is a key-operated lock 30 which is mounted upon the outer side of one of the guide plates 15, the bolt or latch 31 of said lock being formed for engagement with a circumferential groove 32 formed in bolt 21, as clearly seen in Figs. 7 and 10. The arrangement is such, as will be seen, that when the bolt or latch 31 of the lock 30 is engaged with the groove 32 of the bolt 21, the latter will be positively locked in operative position. Said lock, together with the adjacent end of bolt 21, are inclosed in a suitable housing or casing 33 which is seated in a surrounding bead or rib 34 which forms a seat therefor, being secured permanently in position by rivets having counter-sunk heads. The key of lock 30 will be retained by the owner or operator of the vehicle, who, therefore, will be the only one permitted to unlock and operate the lever 14 in order to shift the friction shoes from operative position. The lever 14 is provided with a conventional form of pawl 35 adapted for engagement with notches 36 provided in the upper edges of guide plates 15, whereby said lever may be releasably locked in forward or in operative position.

The rearward end of each of the arms 13 which carry the friction shoes 11, passes over a roller 37 secured to a hanger 38 depending from the bottom of the floor of the vehicle. Arranged above the roller 37 is a rocker arm 39 carrying a roller 40 which is spring-pressed toward the roller 37, this arrangement preventing rattling of the arms 13 during operation of the vehicle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with a self-propelled vehicle having a pair of driving wheels contacting with the roadway, of friction shoes arranged to contact with the ground and be inserted under said vehicle wheels; a lever mounted upon the body of said vehicle and operatively connected with said friction shoes for adjusting the position thereof; and means engageable with openings in said lever for locking said shoes in various positions of adjustment, substantially as described.

2. The combination with a self-propelled vehicle having a pair of driving wheels contacting with the roadway, of friction shoes arranged to contact with the ground and be inserted under said vehicle wheels; a lever mounted upon the body of said vehicle and operatively connected with said friction shoes for adjusting the position thereof; means for locking said shoes in various positions of adjustment, comprising a shiftably mounted bolt engageable with openings in said lever; and a lock arranged for engagement with said bolt, substantially as described.

3. The combination with a self-propelled vehicle having a pair of driving wheels contacting with the roadway, of friction shoes arranged to contact with the ground and be inserted under said vehicle wheels; a lever mounted upon the body of said vehicle and operatively connected with said friction shoes for adjusting the position thereof; means for locking said shoes in various positions of adjustment, comprising a shiftably mounted bolt engageable with said lever; and means for frictionally holding said bolt in inoperative position, substantially as described.

4. The combination with a self-propelled vehicle having a pair of driving wheels contacting with the roadway, of friction shoes arranged to contact with the ground and be inserted under said vehicle wheels; a lever mounted upon the body of said vehicle and operatively connected with said friction shoes for adjusting the position thereof; means for locking said shoes in various positions of adjustment, comprising a shiftably mounted bolt engageable with said lever; and a spring-pressed plunger for frictionally holding said bolt in inoperative position, substantially as described.

5. The combination with a self-propelled vehicle having a pair of driving wheels contacting with the roadway, of friction shoes aranged to contact with the ground and be inserted under said vehicle wheels; a lever mounted upon the body of said vehicle and operatively connected with said friction shoes for adjusting the position thereof; means for locking said shoes in various positions of adjustment, comprising a shiftably mounted bolt engageable with said lever; a spring-pressed plunger for frictionally holding said bolt in inoperative position; and means for adjusting the spring pressure on said plunger, substantially as described.

6. The combination with a self-propelled vehicle having a pair of driving wheels contacting with the roadway, of friction shoes arranged to contact with the ground and be inserted under said vehicle wheels; a lever mounted upon the body of said vehicle and operatively connected with said friction shoes for adjusting the position thereof; guides between which said lever is adapted to move; means for locking said shoes in various positions of adjustment, comprising a transversely extending bolt shiftably mounted in said guides and adapted to engage with said lever, said lever having a plurality of spaced openings adapted for engagement by said bolt; and means for locking said bolt in operative position, substantially as described.

In testimony whereof I have signed my name to this specification in the presence of two subscribing witnesses.

GEORGE W. McKINNY.

Witnesses:
 ROSE KOSKA,
 HELEN F. LILLIS.